US 8,066,300 B2

(12) United States Patent
Ohnishi

(10) Patent No.: US 8,066,300 B2
(45) Date of Patent: Nov. 29, 2011

(54) FOLDABLE PUSHCART AND FOLDABLE BABY CARRIAGE

(75) Inventor: Ichiro Ohnishi, Nara (JP)

(73) Assignee: Aprica Children's Products Inc. (JP)

( * ) Notice: Subject to any disclaimer, the term of this patent is extended or adjusted under 35 U.S.C. 154(b) by 418 days.

(21) Appl. No.: 12/288,068

(22) Filed: Oct. 15, 2008

(65) Prior Publication Data

US 2009/0102163 A1  Apr. 23, 2009

(30) Foreign Application Priority Data

Oct. 22, 2007 (JP) ................................. 2007-274136
Sep. 16, 2008 (JP) ................................. 2008-236824

(51) Int. Cl.
*B62B 7/06* (2006.01)
*B62B 7/08* (2006.01)

(52) U.S. Cl. ..... 280/647; 280/649; 280/650; 280/47.25; 280/47.38; 280/47.4

(58) Field of Classification Search ............ 280/38, 280/42, 47.34, 47.38, 47.39, 47.4, 62, 639, 280/641, 642, 644, 647, 649

See application file for complete search history.

(56) References Cited

U.S. PATENT DOCUMENTS

| 3,172,680 | A | * | 3/1965 | Hire ............................ 280/655 |
| 3,390,893 | A | | 7/1968 | MacLaren |
| 4,762,335 | A | | 8/1988 | Kassai |
| 5,388,852 | A | | 2/1995 | Bigo et al. |
| 5,755,455 | A | | 5/1998 | Chen et al. |
| 5,758,889 | A | * | 6/1998 | Ledakis .................... 280/47.38 |
| 6,428,034 | B1 | * | 8/2002 | Bost ............................ 280/650 |
| 6,824,161 | B2 | * | 11/2004 | Iwata .......................... 280/642 |
| 7,017,936 | B2 | * | 3/2006 | Huang ........................ 280/642 |
| 7,178,822 | B2 | * | 2/2007 | Chen ........................... 280/642 |
| 7,396,038 | B2 | | 7/2008 | Zweideck |
| 7,478,825 | B2 | * | 1/2009 | Tomasi et al. ............... 280/642 |
| 2005/0012287 | A1 | * | 1/2005 | Goldenberg ............... 280/47.38 |
| 2005/0168006 | A1 | * | 8/2005 | Darland .................... 296/97.21 |
| 2005/0212264 | A1 | * | 9/2005 | Yeh et al. .................... 280/647 |
| 2006/0061066 | A1 | * | 3/2006 | Tan ............................. 280/642 |

FOREIGN PATENT DOCUMENTS

| DE | 94 14 168 | 11/1994 |
| DE | 43 28 567 | 3/1995 |
| EP | 0 577 496 | 1/1994 |
| EP | 0 734 934 | 10/1996 |

(Continued)

*Primary Examiner* — Hau Phan
*Assistant Examiner* — Travis Coolman
(74) *Attorney, Agent, or Firm* — Lempia Summerfield Katz LLC

(57) ABSTRACT

A baby carriage includes: a pair of front legs; a pair of connecting members; a pair of guide sleeves respectively fixed to intermediate regions of the pair of front legs, a pair of rear legs having their upper ends pivotally connected to the connecting members, respectively; a pair of push bars slidably held by the pair of connecting members and the pair of guide sleeves, respectively; a pair of slide members provided slidably on upper regions of the pair of rear legs, respectively; a back cross member having its upper end pivotally connected to the pair of slide members and its lower end pivotally connected to respective lower regions of the pair of rear legs; and a bottom cross member having its front end pivotally connected to respective lower ends of the pair of push bars, and its rear end pivotally connected to respective intermediate regions of the pair of rear legs.

6 Claims, 11 Drawing Sheets

FOREIGN PATENT DOCUMENTS

| | | |
|---|---|---|
| GB | 1 560 594 | 2/1980 |
| GB | 2 351 047 | 12/2000 |
| JP | 45-13549 | 6/1970 |
| JP | 62-227855 | 10/1987 |
| JP | 7-012824 | 2/1995 |
| JP | 2001-525291 | 12/2001 |
| JP | 2005-522372 | 7/2005 |
| WO | WO 99/29555 | 6/1999 |
| WO | WO 03/086834 | 10/2003 |

* cited by examiner

FOLDABLE PUSHCART AND FOLDABLE BABY CARRIAGE

BACKGROUND OF THE INVENTION

1. Field of the Invention

The present invention generally relates to a pushcart and a baby carriage. More particularly, the present invention relates to a foldable pushcart that is reduced in size in front-back and width directions when folded, and a foldable baby carriage that is reduced in size in height and width directions when folded. Note that the term "pushcart" has a broad meaning including a baby carriage, a load-carrying cart, and the like.

2. Description of the Background Art

A baby carriage that is reduced in size in height and width directions when folded is disclosed in, for example, Japanese Utility Model Publication No. S45 (1970)-13549 of examined applications and Japanese Patent Publication No. H07 (1995)-12824 of examined applications. The baby carriages disclosed in these publications are structured so that a pair of push bars extending in an up-down direction are bendable forward to a pair of front legs extending in the up-down direction, whereby the height in the folded state is reduced. The baby carriages are also reduced in size in a width direction when folded. In order to enable such reduction in size in the width direction, a pair of rear legs and the pair of push bars are connected to each other by a back cross member formed by two bar members that cross each other in an X shape.

The baby carriages disclosed in Japanese Utility Model Publication No. S45 (1970)-13549 of examined applications and Japanese Patent Publication No. H07 (1995)-12824 of examined applications are structured so that the pair of push bars are bendable forward in order to reduce the height in the folded state. Another type of a baby carriage is disclosed in, for example, Japanese National Phase Publication Nos. 2001-525291 and 2005-522372 of PCT applications. In the baby carriages disclosed in these publications, the height in the folded state of the baby carriage is reduced by moving a pair of push bars downward along a pair of front legs.

In the baby carriages disclosed in Japanese Utility Model Publication No. S45 (1970)-13549 of examined applications and Japanese Patent Publication No. H07 (1995)-12824 of examined applications, an upper part of the back cross member is connected to the back of the pair of push bars. It is therefore difficult to provide a backrest portion located between the pair of push bars in a reclinable manner.

In such a baby carriage having sliding push bars as disclosed in Japanese National Phase Publication Nos. 2001-525291 and 2005-522372 of PCT applications, there is no member that becomes an obstacle on the back of the pair of push bars. It is therefore possible to provide a backrest portion in a reclinable manner. From this standpoint, it can be said that a baby carriage having sliding push bars is preferable. In a baby carriage having sliding push bars, however, it is difficult to provide a back cross member, that connects a pair of push bars with a pair of rear legs. Improvement is therefore required for such a baby carriage to reduce the size in the width direction in the folded state.

Japanese National Phase Publication No. 2005-522372 of PCT applications does not include any description regarding reduction in size of the baby carriage in the width direction in the folded state. Japanese National Phase Publication No. 2001-525291 of PCT applications describes that the baby carriage is reduced in size in the width direction when folded, but does not describe any specific structure to implement such size reduction.

SUMMARY OF THE INVENTION

It is an object of the present invention to provide a foldable baby carriage having sliding push bars, which is capable of implementing reduction in size in a width direction in a folded state by a simple structure.

It is another object of the present invention to provide a foldable pushcart capable of implementing reduction in size in front-back and width directions in a folded state by a simple structure.

A foldable pushcart according to one aspect of the present invention is reduced in size in a front-back direction and a width direction when folded, and includes: a pair of first vertical frame members extending in an up-down direction in parallel with each other; a pair of second vertical frame members extending in the up-down direction in parallel with each other and pivotally connected to upper parts of the pair of first vertical frame members, respectively; a first cross member; and a pair of side frame members. The first cross member includes two bar members crossing each other in an X shape, and has its upper end slidably supported by the pair of first vertical frame members and its lower end pivotally connected to the pair of first vertical frame members. The pair of side frame members extend in the front-back direction in parallel with each other, and has their respective one ends pivotally connected to the upper end of the first cross member, and their respective other ends pivotally connected to the pair of second vertical frame members, respectively.

According to the pushcart having the above structure, by moving the upper end of the first cross member upward, a width dimension of the first cross member is decreased and the distance between the pair of first vertical frame members is reduced. Moreover, the lower parts of the first vertical frame members approach the lower parts of the second vertical frame members through the pair of side frame members. Accordingly, the size of the pushcart can be reduced in the front-back direction and the width direction in the folded state.

Preferably, the pushcart further includes a second cross member including two bar members crossing each other in an X shape, and having its one end slidably supported by the pair of second vertical frame members and its other end pivotally connected to the pair of first vertical frame members.

A pushcart according to one embodiment further includes a pair of third vertical frame members extending in the up-down direction so as to partially overlap the pair of second vertical frame members, respectively, and having their respective lower ends pivotally connected to the second cross member.

A foldable pushcart according to another aspect of the present invention is reduced in size in a front-back direction and a width direction when folded and includes: a pair of first vertical frame members extending in an up-down direction in parallel with each other; a pair of second vertical frame members extending in the up-down direction in parallel with each other and pivotally connected to upper parts of the pair of first vertical frame members, respectively; a first cross member; and a second cross member. The first cross member includes two bar members crossing each other in an X shape, and has its upper end slidably supported by the pair of first vertical frame members and its lower end pivotally connected to the pair of first vertical frame members. The second cross member includes two bar members crossing each other in an X shape, and has its one end slidably supported by the pair of second vertical frame members and its other end pivotally connected to the pair of first vertical frame members.

A foldable baby carriage according to the present invention is reduced in size in a height direction and a width direction when folded and includes: a pair of front legs extending in an up-down direction and having front wheels at their respective lower ends; a pair of rear legs extending in the up-down direction and having rear wheels at their respective lower ends; a pair of push bars extending in the up-down direction so as to partially overlap the pair of front legs, respectively; a pair of connecting members respectively fixed to upper ends of the pair of front legs; a pair of guide sleeves respectively fixed to intermediate regions of the pair of front legs; a pair of slide members provided slidably on upper regions of the pair of rear legs, respectively; a back cross member; and a bottom cross member.

The pair of rear legs have their upper ends pivotally connected to the pair of connecting members, respectively. The pair of push bars are slidably held by the pair of connecting members and the pair of guide sleeves, respectively. The back cross member includes two bar members crossing each other in an X shape, and has its upper end pivotally connected to the pair of slide members and its lower end pivotally connected to respective lower regions of the pair of rear legs. The bottom cross member includes two bar members crossing each other in an X shape, and has its front end pivotally connected to the respective lower ends of the pair of push bars and its rear end pivotally connected to respective intermediate regions of the pair of rear legs.

In the baby carriage having the above structure, there is no obstacle on the back of the pair of push bars which hinders reclining operation of a backrest portion. Moreover, as the pair of push bars are moved downward, a crossing angle between the bottom cross member and the back cross member changes accordingly, and the respective distances between the pair of front legs, between the pair of rear legs, and between the pair of push bars are reduced. The baby carriage can thus be reduced in size in the height and width directions in the folded state.

In a preferred embodiment, the baby carriage further includes a pair of support bars extending in a front-back direction and having their respective front or intermediate regions pivotally connected to the pair of front legs and their respective rear ends pivotally connected to the pair of slide members, respectively.

Preferably, the baby carriage further includes an open-state lock mechanism for fixing a crossing angle between the two bar members of the back cross member in an open state of the baby carriage. More preferably, the baby carriage further includes a push bar lock mechanism for fixing a position of the push bars with respect to the front legs in an open state of the baby carriage.

In a preferred embodiment, the baby carriage further includes a handle member having an inverted U-shape for connecting respective upper ends of the pair of push bars to each other. This handle member includes a first handle arm having an L shape and having its one end fixed to the upper end of one of the push bars, a second handle arm having an L shape symmetric to that of the first handle arm and having its one end fixed to the upper end of the other push bar, and a connecting mechanism for separably connecting respective other ends of the first handle arm and the second handle arm to each other.

In a more preferred embodiment, the baby carriage further includes a canopy having its both ends in a width direction respectively connected to and held by the pair of push bars at a position lower than the pair of connecting members.

DESCRIPTION OF THE PREFERRED EMBODIMENTS

Figure 1:
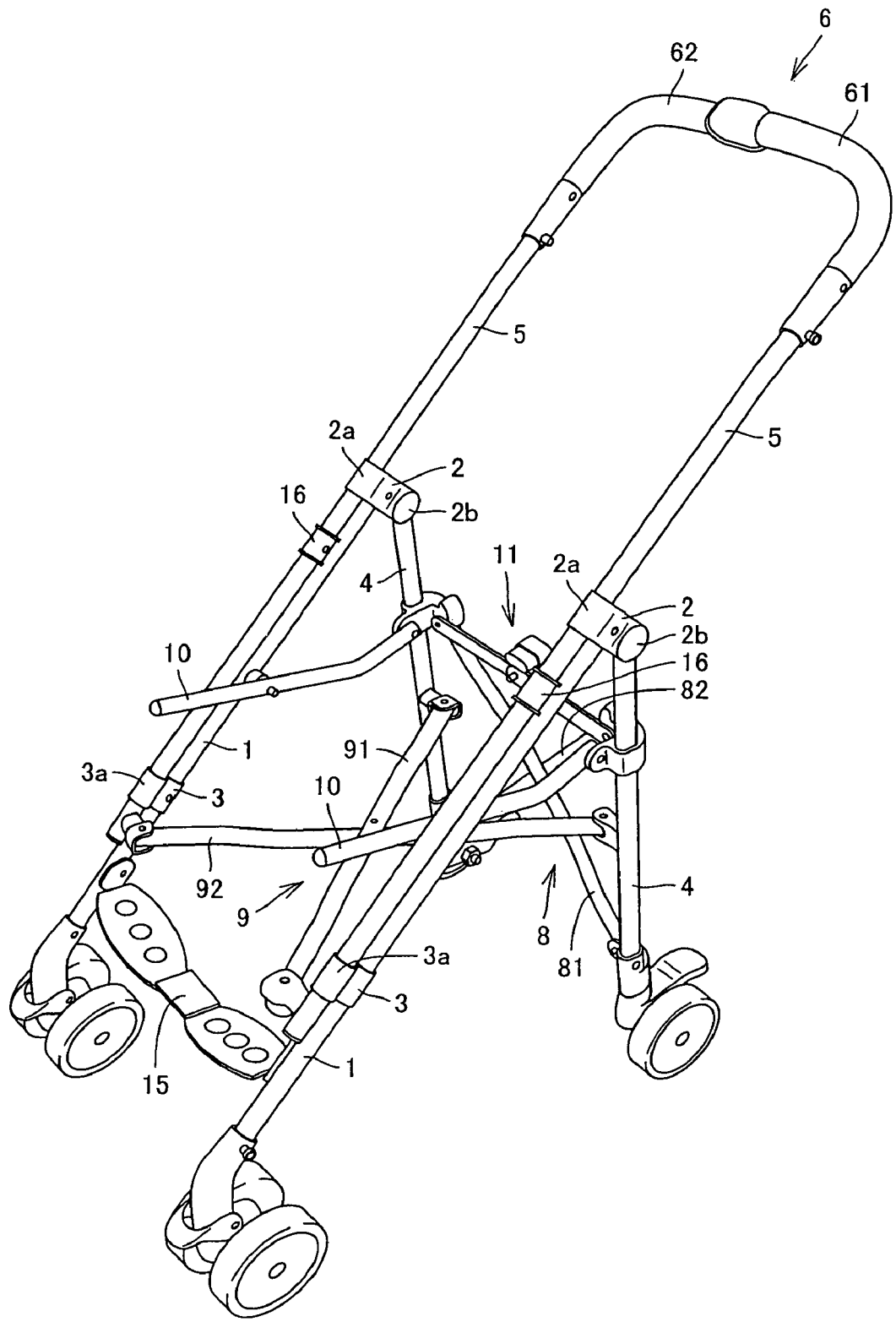
FIG. 1 is a perspective view of a body frame according to an embodiment of the present invention.
Figure 2:
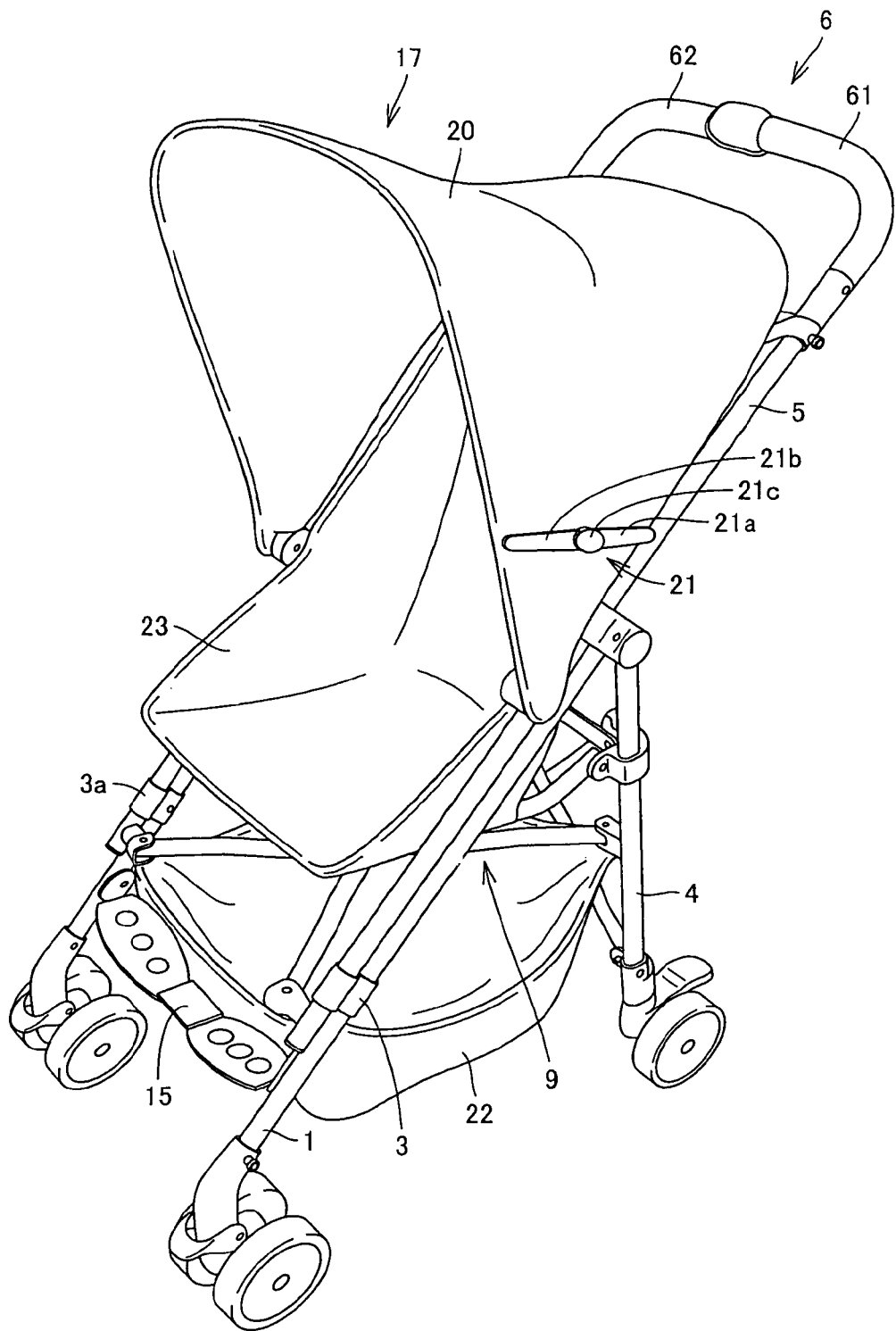
FIG. 2 is a perspective view of a baby carriage according to an embodiment of the present invention.
Figure 3:
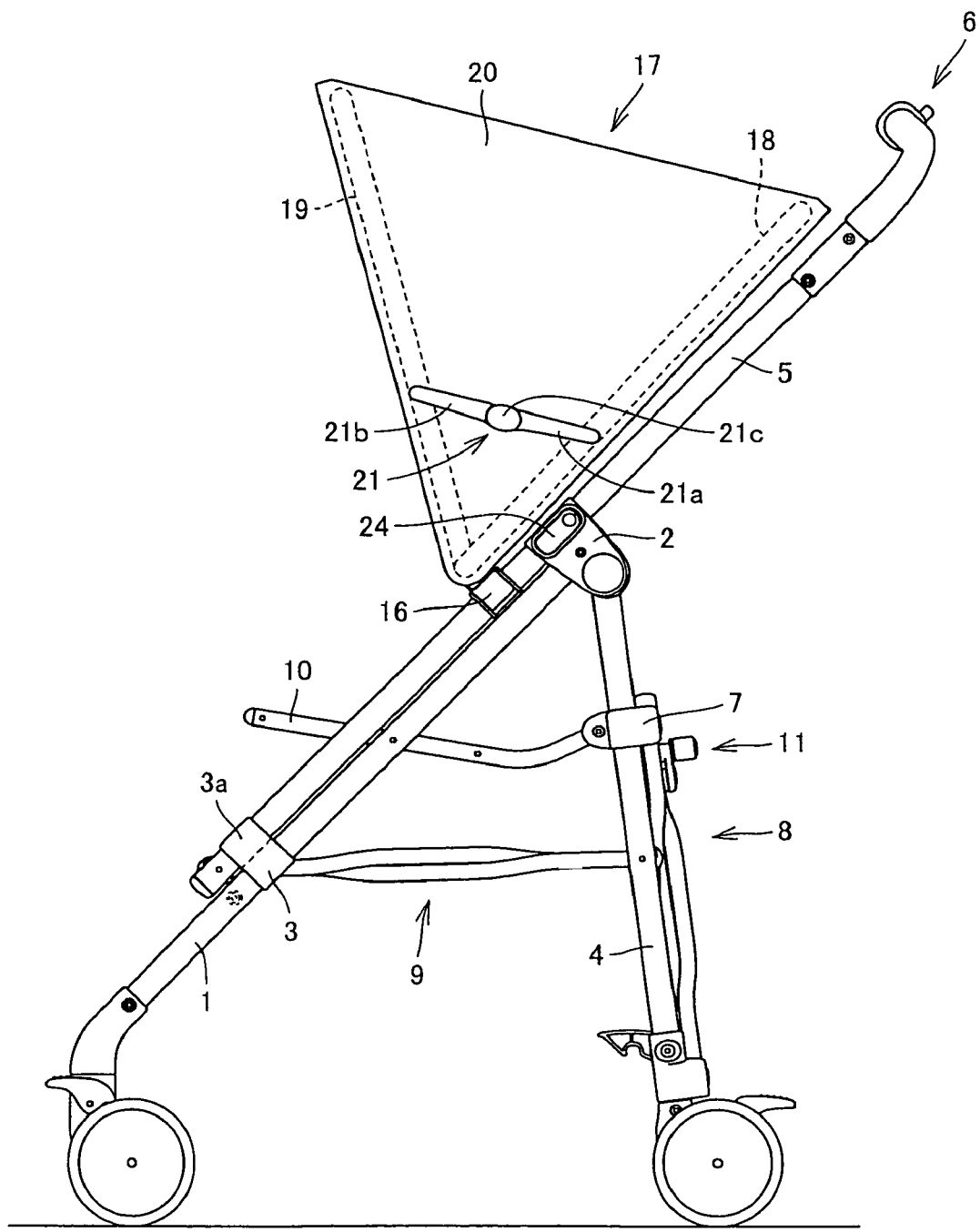
FIG. 3 is a side view of a canopied body frame according to an embodiment of the present invention.
Figure 4:
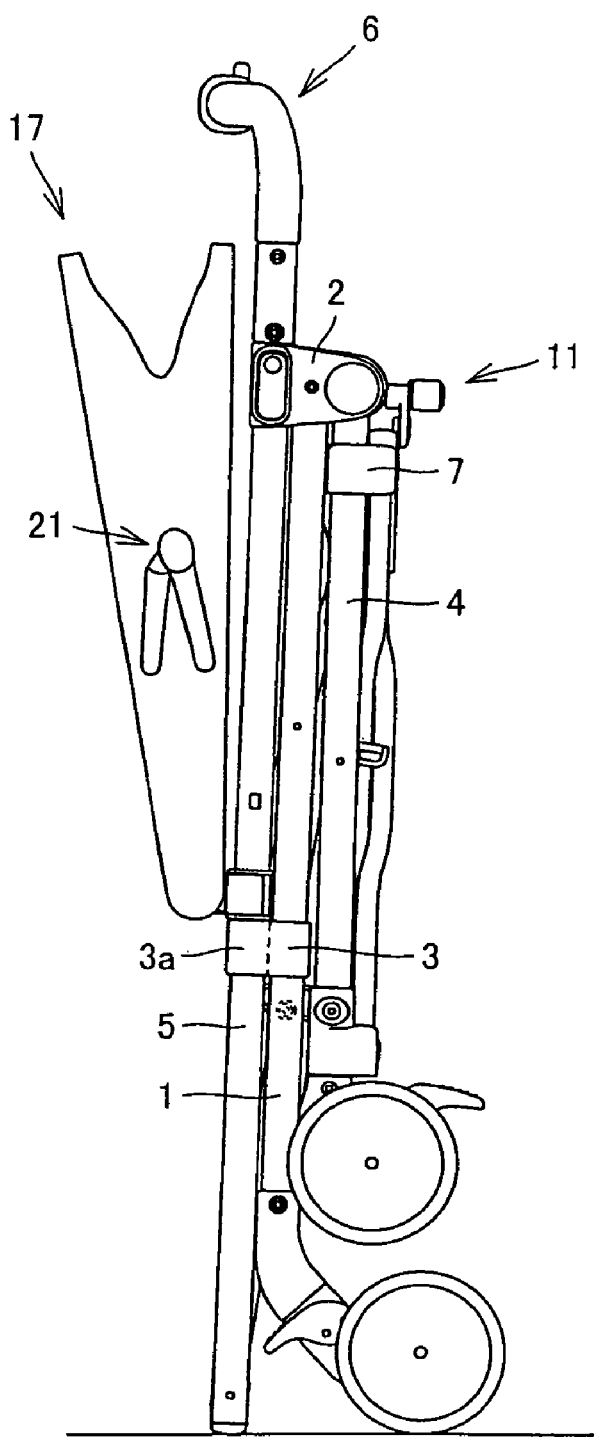
FIG. 4 is a side view showing a folded state of the canopied body frame according to an embodiment of the present invention.

FIGS. 1 through 4 show an overall structure of a foldable baby carriage. FIG. 1 shows a body frame of the baby carriage. FIG. 2 shows the baby carriage having a seat hammock 23, a canopy 17, and a storage bag 22 mounted thereto. FIG. 3 is a side view of the baby carriage in an open state. FIG. 4 is a side view of the baby carriage in a folded state.

The baby carriage is reduced in size in height and width directions when folded. The baby carriage includes, as main components of the body frame, a pair of front legs 1, a pair of rear legs 4, a pair of push bars 5, a handle member 6, a pair of seat support bars 10, a back cross member 8, and a bottom cross member 9.

Each front leg 1 extends in an up-down direction and has a front wheel at its lower end and a connecting member 2 at its upper end. Each connecting member 2 is fixed to the corresponding front leg 1 and has a cylindrical body 2a in its front part and a projecting portion 2b in its rear part. A guide sleeve 3 is fixedly attached to an intermediate region of each front leg 1. Each guide sleeve 3 has a cylindrical body 3a in its front part.

Each rear leg 4 extends in the up-down direction and has a rear wheel at its lower end. An upper end of each rear leg 4 is pivotally connected to the projecting portion 2b of the corresponding connecting member 2 fixed to the corresponding front leg 1. As the baby carriage is folded, each rear leg 4 pivots in a direction approaching the corresponding front leg 1. In the folded state shown in FIG. 4, each rear leg 4 and each front leg 1 are located in parallel with each other, and the rear wheels are located above the front wheels.

Each push bar 5 extends in the up-down direction so that a lower region thereof overlaps the corresponding front leg 1.

Each push bar 5 is slidably held by the cylindrical bodies 2a, 3a of the connecting member 2 and the guide sleeve 3 that are fixed to the corresponding front leg 1. As the baby carriage is folded, each push bar 5 slides downwards on the corresponding front leg 1. In the folded state shown in FIG. 1, a lower end of each push bar 5 abuts on the ground. The lower ends of the push bars 5 and the front wheels which are in contact with the ground enable self-standing of the baby carriage in the folded state.

Figure 5:
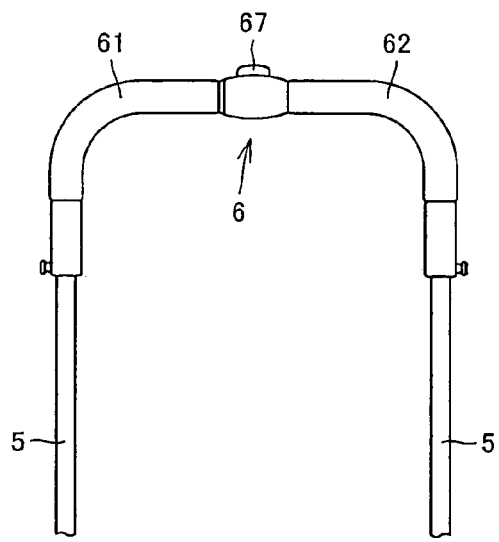
FIG. 5 is a back view of a pair of push bars and a handle member.
Figure 6:
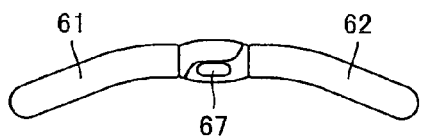
FIG. 6 is a plan view of the handle member.

Respective upper ends of the pair of push bars 5 are connected to each other by the inverted U-shaped handle member 6. As shown in FIGS. 5 and 6, the handle member 6 has an L-shaped first handle arm 61 having its one end fixed to the upper end of one push bar 5 and an L-shaped second handle arm 62 having its one end fixed to the upper end of the other push bar 5. The other end of the first handle arm 61 and the other end of the second handle arm 62 are separably connected to each other by a connecting mechanism. This structure will be described later in more detail with reference mainly to FIGS. 9 to 12.

Figure 7:
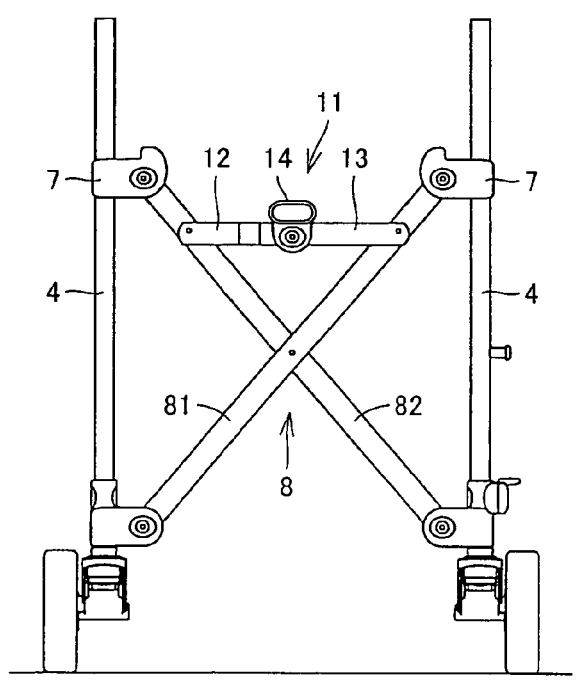
FIG. 7 is a back view of a pair of rear legs and a back cross member.
Figure 8:
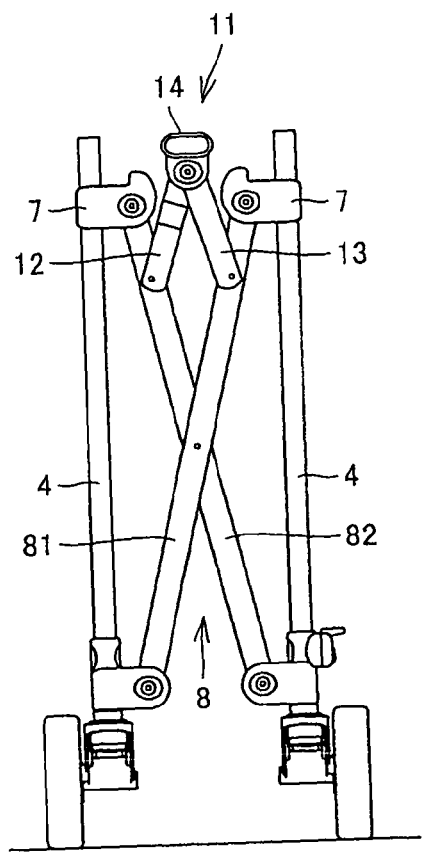
FIG. 8 is a back view of the pair of rear legs and the back cross member in a folded state of the baby carriage.

FIGS. 7 and 8 are back views of the pair of rear legs 4 and the back cross member 8. FIG. 7 shows an open state of the baby carriage and FIG. 8 shows a folded state of the baby carriage. A pair of slide members 7 are slidably provided on upper regions of the pair of rear legs 4, respectively. Each slide member 7 slides upward on the corresponding rear leg 4 as the baby carriage is folded.

The back cross member 8 includes a first bar member 81 and a second bar member 82 which cross each other in an X shape. The first bar member 81 and the second bar member 82 have their upper ends pivotally connected to the pair of slide members 7 and their lower ends pivotally connected to lower regions of the pair of rear legs 4, respectively. The first bar member 81 and the second bar member 82 are pivotally connected to each other at the crossing portion. As can be seen from FIGS. 7 and 8, in the folded state of the baby carriage, the distance between upper and lower ends of the back cross member 8 is longer and the distance between the pair of rear legs 4 is shorter than in the open state of the baby carriage.

As shown in FIGS. 1 and 3, the bottom cross member 9 includes a first bar member 91 and a second bar member 92 which cross each other in an X shape. The first bar member 91 and the second bar member 92 have their front ends pivotally connected to the lower ends of the pair of push bars 5 and their rear ends pivotally connected to intermediate regions of the pair of rear legs 4, respectively. As the baby carriage is folded and the pair of push bars 5 move downwards along the front legs 1, the front ends of the bottom cross member 9 connected to the lower ends of the push bars 5 also move downward accordingly. As a result, the pair of rear legs 4 connected to the rear ends of the bottom cross member 9 are pivoted toward the front legs 1. With increase in the amount of downward movement of the lower ends of the push bars 5, the distance between the front and rear ends of the bottom cross member 9 increases, and the distance between the pair of front legs 1 and the distance between the pair of rear legs 4 therefore decrease.

The pair of seat support bars 10 extend in a front-back direction so as to support a seat portion of the seat hammock 23. The seat support bars 10 has their front or intermediate regions pivotally connected to the pair of front legs 1 and their rear ends pivotally connected to the pair of slide members 7, respectively. As the baby carriage is folded, the slide members 7 move upward on the rear legs 4. As a result, the seat support bars 10 pivot counterclockwise in FIG. 3. In the folded state of the baby carriage, the seat support members 10 are located along the inner side of the front legs 1.

As shown in FIGS. 7 and 8, the back cross member 8 has an open-state lock mechanism 11 for fixing a crossing angle between the first bar member 81 and the second bar member 82 in the open state of the baby carriage. The open-state lock mechanism 11 includes a first link bar 12 having its one end pivotally connected to the second bar member 82, a second link bar 13 having its one end pivotally connected to the first bar member 81, and an operation member 14. In the open state of the baby carriage, the first link bar 12 and the second link bar 13 are fixed at a position slightly beyond a change point, whereby the crossing angle between the first bar member 81 and the second bar member 82 is fixed. In order to fold the baby carriage, the operation member 14 is pulled up with hand so that the first link bar 12 and the second link bar 13 are bent upward.

As shown in FIG. 3, each connecting member 2 fixed to the upper end of the corresponding front leg 1 has an operation button 24 having a lock pin. Each push bar 50 has a lock hole for receiving the lock pin at least in the open state of the baby carriage. The lock pin of the operation button 24 and the lock hole formed in the push bar 5 form a push bar lock mechanism for fixing the position of the push bar with respect to the front leg in the open state of the baby carriage. By operating the operation button 24 so as to disengage the lock pin and the lock hole from each other, the push bar 5 becomes slidable along the front leg 1.

As shown in FIG. 1, respective lower parts of the pair of front legs 1 are connected to each other by a footrest member 15 that is bendable in the middle. In the open state of the baby carriage, the footrest member 15 extends approximately linearly along the width direction. In the folded state of the baby carriage, on the other hand, the footrest member 15 is bent into a V-shape.

As can be seen from FIG. 3, the canopy 17 has its both ends in the width direction respectively connected to and held by the pair of push bars 5 at a position lower than the pair of connecting members 2. More specifically, each push bar 5 has a canopy support sleeve 16 fixed at a position lower than the respective connecting member 2. The canopy 17 includes canopy ribs 18, 19 pivotally held by the canopy support sleeves 16, and a canopy cloth 20 provided between the plurality of canopy ribs. In the illustrated embodiment, the canopy 17 has a dome shape and includes the first canopy rib 18 and the second canopy rib 19. The first canopy rib 18 and the second canopy rib 19 have such a structure that, or are made of such a material that, can reduce the distance in the width direction when the baby carriage is folded.

In the illustrated embodiment, the canopy 17 includes opening-angle fixing means 21 on its right and left sides for fixing an opening angle between the first canopy rib 81 and the second canopy rib 82. The opening-angle fixing means 21 includes a first link plate 21a having its one end connected to the first canopy rib 18, a second link plate 21b having its one end connected to the second canopy rib 19, and an operation knob 21c for moving the first and second link plates 21a, 21b into a bent position in order to fold the canopy.

The canopy 17 has its both ends respectively supported by the canopy support sleeves 16 fixed to the pair of push bars 5. Therefore, as the baby carriage is folded and the pair of push bars 5 move downward, the canopy 17 also moves downward accordingly. In the folded state of the baby carriage shown in FIG. 4, the canopy 17 is also folded. In the illustrated embodiment, the canopy 17 thus moves downward together with the push bars 5 even with the canopy 17 kept attached to the body of the baby carriage. The height of the baby carriage in the folded state can thus be reduced.

In the baby carriages disclosed in Japanese Utility Model Publication No. S45 (1970)-13549 of examined applications and Japanese Patent Publication No. H07 (1995)-12824 of examined applications, upper ends of the pair of push bars are free ends. A certain amount of wobbling of the push bars is unavoidable. Such wobbling of the push bars can be reduced by providing a handle member connecting upper ends of the pair of push bars. In this case, in order to reduce the dimension in the width direction in the folded state of the baby carriage, the handle member is typically formed by a plurality of members that are pivotally connected to each other. In this structure, the handle member is bent at the joint between the members, whereby the distance between the pair of push bars is reduced. When such a bendable joint is present, however, the baby carriage becomes shaky at the joint in the open state of the baby carriage. The body frame therefore does not have sufficient rigidity.

In the embodiment of the present invention, the handle member 6 connecting the upper ends of the pair of push bars 5 has a characteristic structure in order to improve the rigidity of the body frame of the baby carriage in the open state. More specifically, in the illustrated embodiment, the first handle arm 61 and the second handle arm 62 of the handle member 6 are separably connected by the connecting mechanism. This structure will be described in detail with reference to FIGS. 9 through 12.

Figure 11:
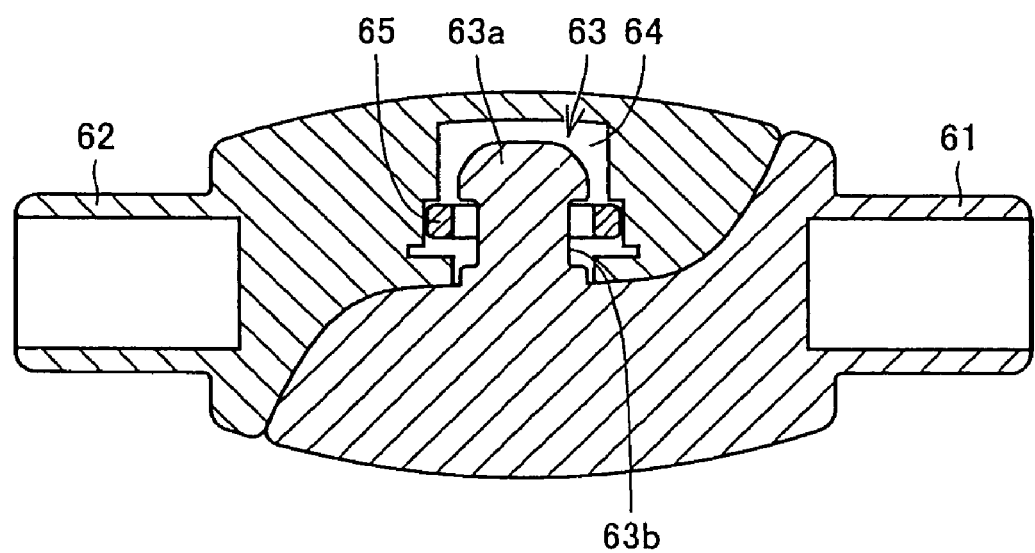
FIG. 11 is a top cross-sectional view of the connecting mechanism.

As shown in FIGS. 6 and 11, an inner end of the first handle arm 61 includes a thinned portion having a reduced thickness, and an inner end of the second handle arm 62 also has a thinned portion having a reduced thickness. These thinned portions are separably connected by the connecting mechanism.

The connecting mechanism includes a fixed shaft 63 fixed to the inner end of the first handle arm 61, a shaft receiving space 64 formed in the inner end of the second handle arm 62 so as to receive the fixed shaft 63, and a lock member 65. The fixed shaft 63 protrudes toward the rear of the baby carriage and includes a head portion 63a having a larger diameter and a neck portion 63b having a smaller diameter.

Figure 9:
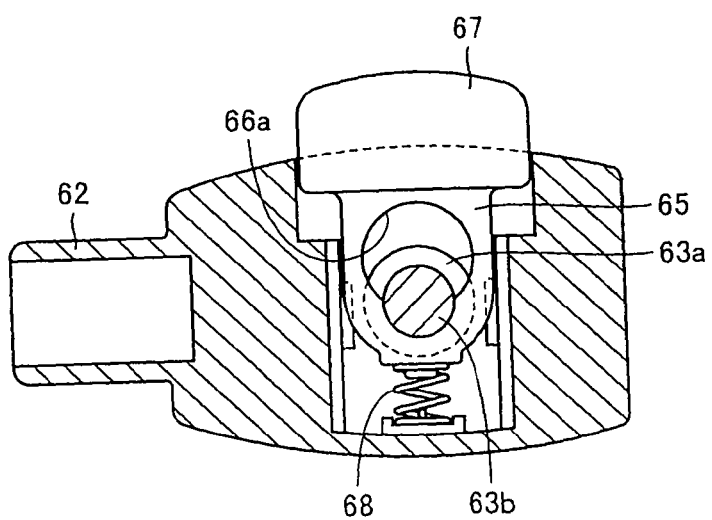
FIG. 9 is a front view of a main part of a connecting mechanism for separably connecting the first handle arm and the second handle arm to each other.
Figure 10:
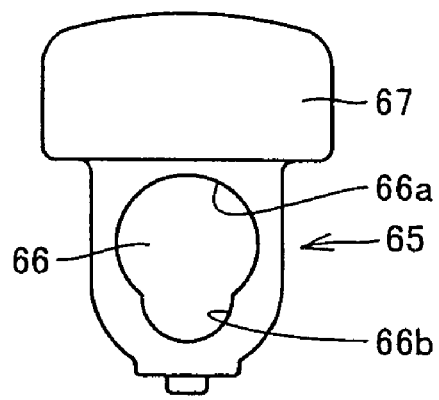
FIG. 10 is a front view of a lock member.

As shown in FIGS. 9 and 10, the lock member 65 has a flat, plate-like shape that is long in the up-down direction, and has a through hole 66 in the middle. The through hole 66 has a large-diameter hole 66a located on the upper side and having a larger diameter, and a small-diameter hole 66b formed so as to overlap a lower part of the large-diameter hole 66a and having a smaller diameter. The diameter of the large-diameter hole 66a is larger than that of the head portion 63a of the fixed shaft 63, and the diameter of the small-diameter hole 66b is smaller than that of the head portion 63a of the fixed shaft 63 and is slightly larger than that of the neck portion 63b.

The lock member 65 is located within the shaft receiving space 64 of the second handle arm 62. The operation member 67 is fixed to an upper end of the lock member 65. The operation member 67 protrudes upward from and is exposed from the top surface of the inner end of the second handle arm 62. As shown in FIG. 9, a biasing member 68 for constantly biasing the lock member 65 upward is provided between a lower end of the lock member 65 and a bottom wall portion of the second handle arm 62. In the illustrated embodiment, the biasing member 68 is a coiled spring.

In the state of FIG. 9, the neck portion 63b of the fixed shaft 63 fixed to the first handle arm 61 fits in the small-diameter hole 66b of the lock member 65 supported by the second handle arm 62. This engaged state is maintained by the biasing force of the biasing member 68. The lock member 65 is interposed between the head portion 63a of the fixed shaft 63 and the first handle arm 61. The first handle arm 61 and the second handle arm 62 are therefore in a fixedly connected state. This state corresponds to the open state of the baby carriage.

Figure 12:
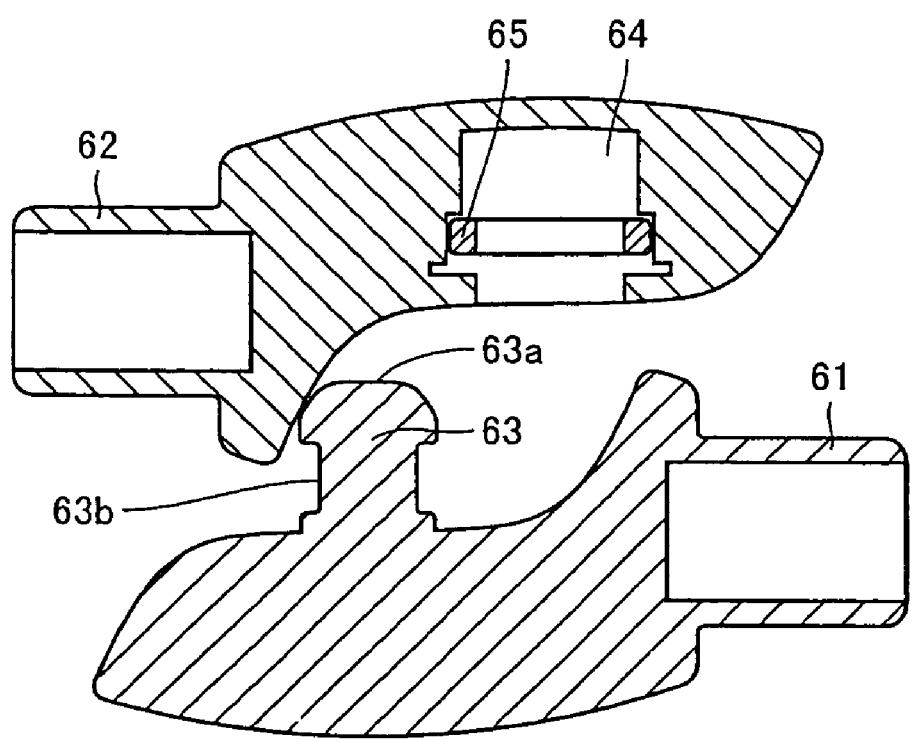
FIG. 12 is a diagram showing a state in which the first handle arm and the second handle arm are separated from each other.

In order to fold the baby carriage, the operation member 67 is pressed down to move the lock member 65 to a lower position. In this position, the large-diameter hole 66a of the lock member 65 is aligned with the head portion 63a of the fixed shaft 63. Accordingly, by moving the inner end of the first handle arm 61 forward relative to the inner end of the second handle arm 62, the head portion 63a of the fixed shaft 63 passes through the large-diameter hole 66a of the lock member 65 and the first handle arm 61 and the second handle arm 62 are separated from each other. FIG. 12 shows a state in which the first handle arm 61 and the second handle arm 62 are separated from each other in the folded state of the baby carriage. Since the distance between the pair of push bars 5 is reduced, the first handle arm 61 moves to the left in the figure and the second handle arm 63 moves to the right in the figure.

The folding operation of the baby carriage will be described step by step. First, the operation member 67 located in the middle of the handle member 6 is pressed down to separate the first handle arm 61 and the second handle arm 62 from each other. The operation member 14 of the open-state lock mechanism 11 attached to the back cross member 8 is then pulled up. Next, the operation buttons 24 supported by the connecting members 2 are operated to disengage the lock pin and the lock hole from each other, and the pair of push bars 5 are then moved downward.

Figure 13:
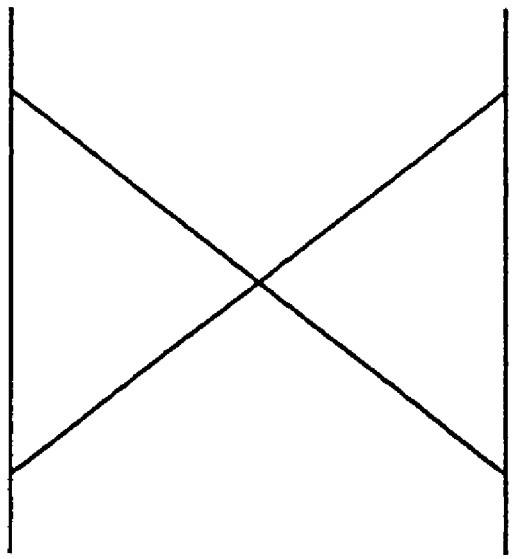
FIG. 13 is a diagram illustrating one form of "crossing each other in an X shape"
Figure 14:
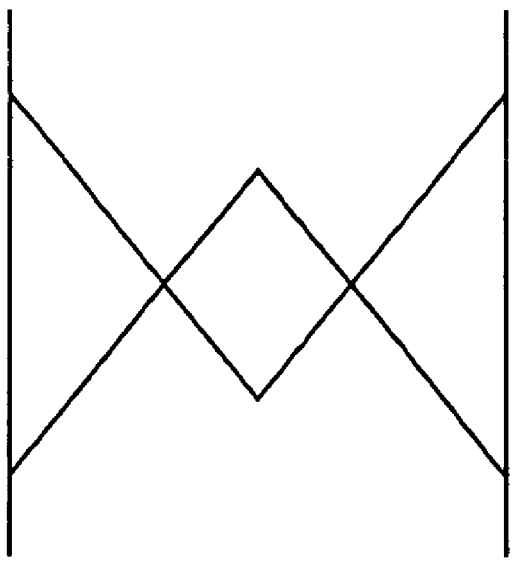
FIG. 14 is a diagram illustrating another form of "crossing each other in an X shape"

Note that, in the illustrated embodiment of the present invention, the back cross member and the bottom cross member are structured so that two bar members "cross each other in an X shape" as shown in FIG. 13. It should be understood that the phrase "cross each other in an X shape" in the present invention is not limited to the typical shape shown in FIG. 13 but includes a shape including a plurality of X crossing portions as shown in FIG. 14.

Moreover, in the illustrated embodiment, the respective upper ends of the pair of push bars are separably connected to each other through the connecting mechanism. In another embodiment, however, the respective upper ends of the pair of push bars may be always separated from each other without being connected together.

The present invention is applicable also to a pushcart having a broad meaning including a baby carriage, a load-carrying cart, and the like.

Figure 15:
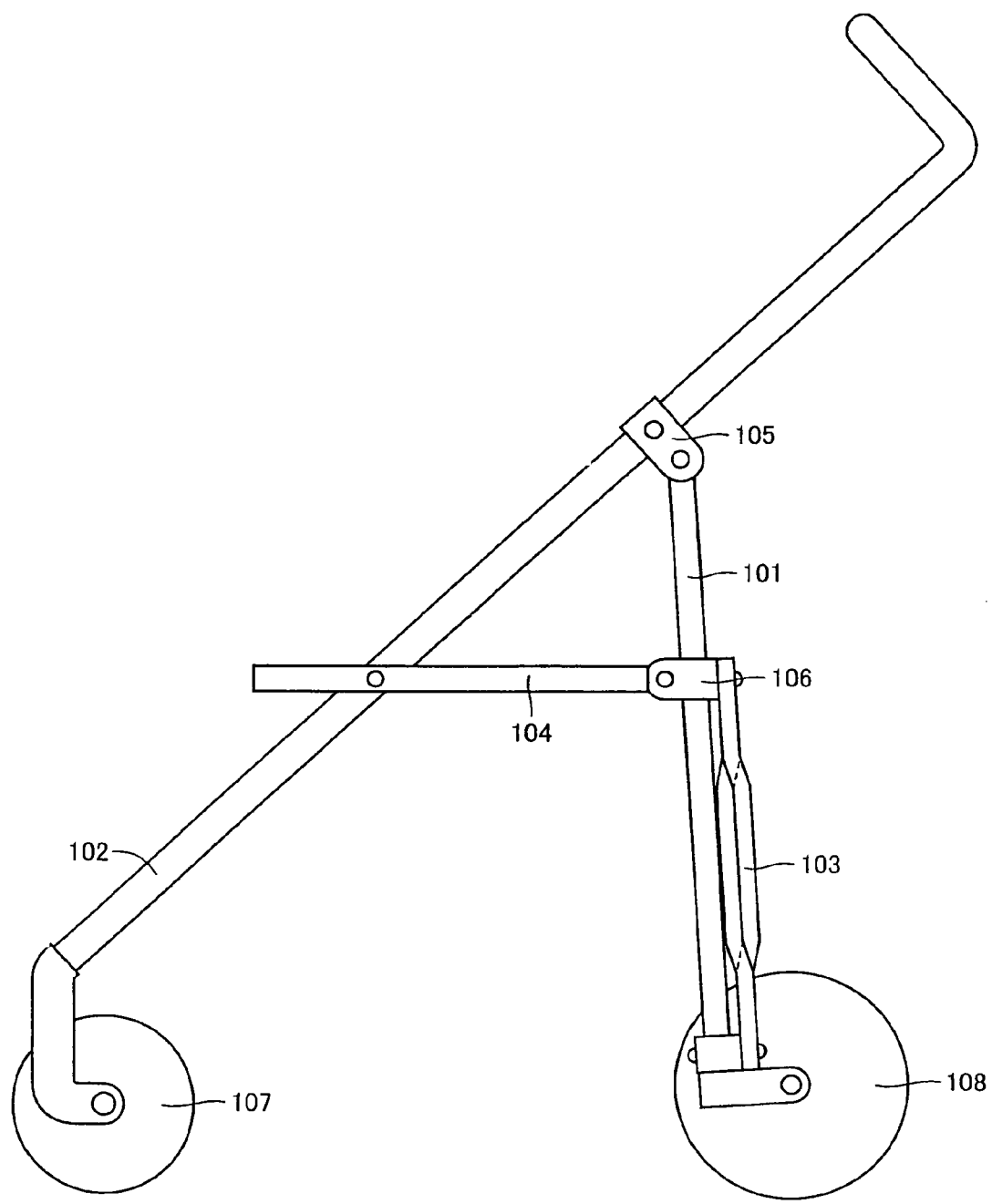
FIG. 15 is a side view showing an open state of a pushcart according to another embodiment of the present invention.
Figure 16:
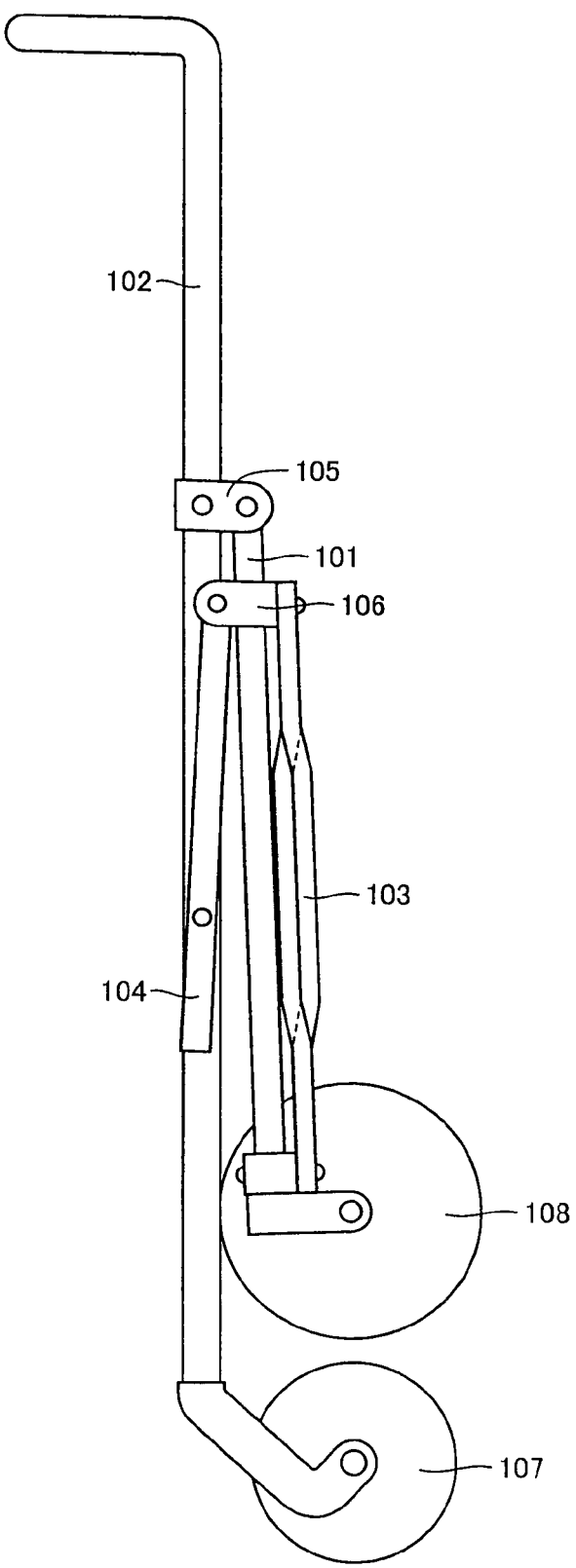
FIG. 16 is a side view showing a folded state of the pushcart according to another embodiment of the present invention.

FIGS. 15 and 16 are side views showing another embodiment of the present invention. FIG. 15 shows an open state of a pushcart, and FIG. 16 shows a folded state of the pushcart. The pushcart is reduced in size in front-back and width directions when folded.

The pushcart shown in FIGS. 15 and 16 includes a pair of first vertical frame members 101 extending in an up-down direction in parallel with each other, a pair of second vertical frame members 102 extending in the up-down direction in parallel with each other and pivotally connected to upper parts of the pair of first vertical frame members 101 through connecting members 105, respectively, a first cross member 103, and a pair of side frame members 104. A rear wheel 108 is attached to a lower end of each first vertical frame member 101, and a front wheel 107 is attached to a lower end of each second vertical frame member 102.

As in the above embodiment, the first cross member 103 includes two bar members that cross each other in an X shape. The two bar members have their respective upper ends slidably supported by the pair of first vertical frame members 101 through a pair of slide members 106, respectively, and have their respective lower ends pivotally connected to lower parts of the pair of first vertical frame members 101, respectively.

The pair of side frame members 104 extend in the front-back direction in parallel with each other. The pair of side frame members 104 have their respective one ends pivotally connected to an upper end of the first cross member 103 through the pair of slide members 106, respectively, and have their respective other ends pivotally connected to the pair of second vertical frame members 102, respectively.

In order to fold the pushcart, the pair of slide members 106 are moved upward. As the slide members 106 are moved upward, the width dimension of the first cross member 103 is reduced and the distance between the pair of first vertical frame members 101 is reduced. Moreover, since the respective rear ends of the pair of side frame members 104 move upward together with the slide members 106, the respective lower parts of the pair of second vertical frame portions 102 are pulled toward the lower parts of the pair of first vertical frame members 101 by the pair of side frame members 104. The pushcart is thus reduced in size in the front-back and width directions in the folded state.

The pushcart of the embodiment shown in FIGS. 15 and 16 may further include a second cross member as in the above embodiment of the baby carriage. The second cross member includes two bar members crossing each other in an X shape. The two bar members have their respective one ends slidably supported by the pair of second vertical frame members 102, respectively, and their respective other ends pivotally connected to the pair of first vertical frame members 101, respectively.

The pushcart may further include a pair of third vertical frame members as in the above embodiment of the baby carriage. The pair of third vertical frame members extend in the up-down direction so as to partially overlap the pair of second vertical frame members, respectively, and respective lower ends of the pair of third vertical frame members are pivotally connected to the second cross member. In a folding operation of the pushcart of this embodiment, the respective lower ends of the third vertical frame members and one end of the second cross member slide downward along the second vertical frame members 102.

As a modification of the embodiment shown in FIGS. 15 and 16, the pair of side frame members 104 may be omitted and a second cross member may be provided. The second cross member includes two bar members crossing each other in an X shape. The two bar members have their respective one ends slidably supported by the pair of second vertical frame members 102, respectively, and their respective other ends pivotally connected to the pair of first vertical frame members 101, respectively.

Although embodiments of the present invention have been described above with reference to the figures, the present invention is not limited to the above described and illustrated embodiments. Various modifications and variations can be made to the above described and illustrated embodiments within the same scope as, or an equivalent scope to, the present invention.

The present invention can be advantageously used as a foldable pushcart that is reduced in size in front-back and width directions when folded, or as a foldable baby carriage that is reduced in size in height and width directions when folded.

What is claimed is:

1. A foldable baby carriage that is reduced in size in a height direction and a width direction when folded, comprising:
   a pair of front legs extending in an up-down direction and having front wheels at their respective lower ends;
   a pair of connecting members respectively fixed to upper ends of said pair of front legs;
   a pair of guide sleeves respectively fixed to intermediate regions of said pair of front legs;
   a pair of rear legs extending in the up-down direction, having rear wheels at their respective lower ends, and having their upper ends pivotally connected to said connecting members, respectively;
   a pair of push bars extending in the up-down direction so as to partially overlap said pair of front legs, and slidably held by said pair of connecting members and said pair of guide sleeves, respectively;
   a pair of slide members provided slidably on upper regions of said pair of rear legs, respectively;
   a back cross member including two bar members crossing each other in an X shape, and having its upper end pivotally connected to said pair of slide members and its lower end pivotally connected to respective lower regions of said pair of rear legs; and
   a bottom cross member including two bar members crossing each other in an X shape, and having its front end pivotally connected to the respective lower ends of said pair of push bars and its rear end pivotally connected to respective intermediate regions of said pair of rear legs,
   wherein the rear end of the bottom cross member is configured not to translate in the up-down direction along the rear leg when the foldable baby carriage is being folded.

2. The foldable baby carriage according to claim 1, further comprising a pair of support bars extending in a front-back direction and having their respective front or intermediate regions pivotally connected to said pair of front legs and their respective rear ends pivotally connected to said pair of slide members, respectively.

3. The foldable baby carriage according to claim 1, further comprising an open-state lock mechanism for fixing a crossing angle between said two bar members of said back cross member in an open state of said baby carriage.

4. The foldable baby carriage according to claim 1, further comprising a push bar lock mechanism for fixing a position of said push bars with respect to said front legs in an open state of said baby carriage.

5. The foldable baby carriage according to claim 1, further comprising a handle member having an inverted U-shape for connecting respective upper ends of said pair of push bars to each other, wherein said handle member includes a first handle arm having an L shape and having its one end fixed to the upper end of one of said push bars, a second handle arm having an L shape symmetric to that of said first handle arm and having its one end fixed to the upper end of the other push bar, and a connecting mechanism for separably connecting respective other ends of said first handle arm and said second handle arm to each other.

6. The foldable baby carriage according to claim 1, further comprising a canopy having its both ends in a width direction respectively connected to and held by said pair of push bars at a position lower than said pair of connecting members.

* * * * *